Jan. 10, 1961
M. G. MATHERS
2,967,788
METHOD OF IMPREGNATING WOUND CONDENSER
BUSHINGS WITH A DIELECTRIC LIQUID
Filed Aug. 20, 1957
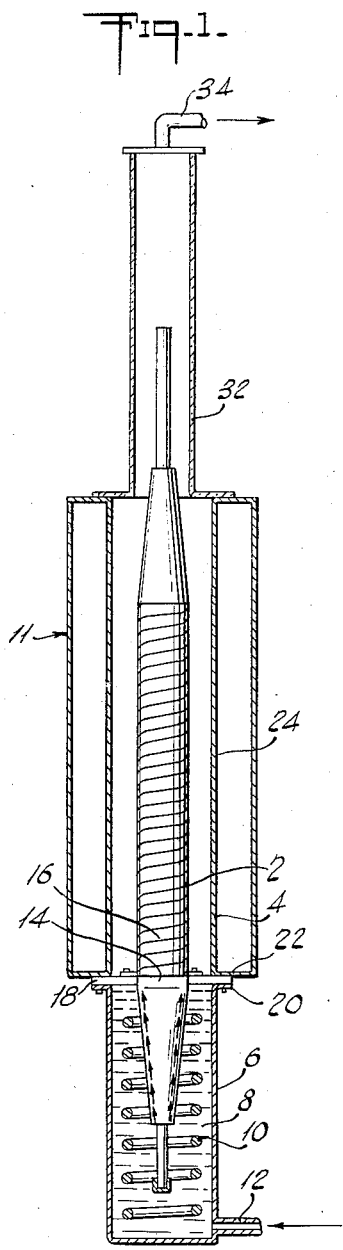
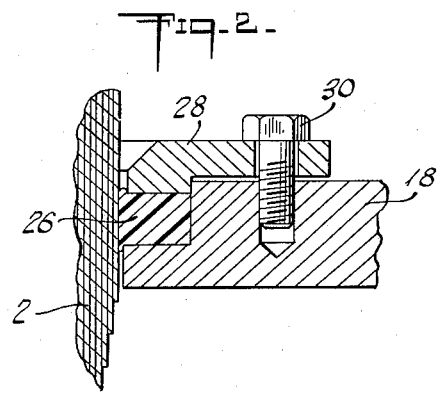
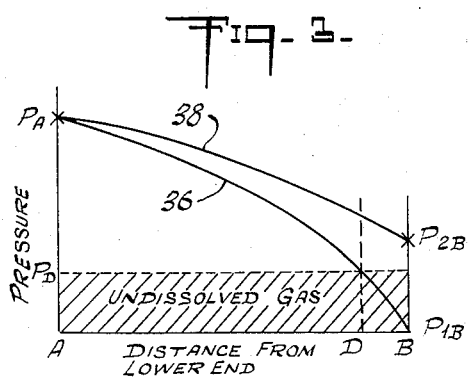
INVENTOR
MARC G. MATHERS
BY Paul S. Martin
ATTORNEY 2,967,788
Patented Jan. 10, 1961

2,967,788

METHOD OF IMPREGNATING WOUND CONDENSER BUSHINGS WITH A DIELECTRIC LIQUID

Marc G. Mathers, San Mateo, Calif., assignor to Federal Pacific Electric Company, a corporation of Delaware Filed Aug. 20, 1957, Ser. No. 679,273

9 Claims. (Cl. 117—94)

This invention relates to method of impregnating elongated articles with a liquid, and in particular to impregnating wound condenser bushings with a dielectric liquid.

The invention is described in connection with condenser bushings of a well-known type. Oil-filled wound electrically insulating bushings are employed, for example, in oil circuit breakers to perform essentially two important functions. First, they furnish the insulation-sheathed conductor which enters into the circuit breaker oil tank and, second, they provide mechanical support for the circuit interrupting mechanism. Since the bushings are merely accessories, they should have the ability to withstand voltages in excess of that to which the breaker is subject so as not to limit the breaker performance. A commonly employed bushing for this purpose is the condenser type oil-filled bushing.

The heart of the bushing is the condenser core which provides insulation between a central conductor, which is at line potential, and the grounded mounting flange. It is formed by winding electrical quality kraft paper onto a conductor rod and inserting, at fixed intervals, sheets of aluminum foil which form the plates of the condenser. These foils form one complete turn around the core with some overlap and may be radially spaced about one-sixteenth inch apart. The ends of the winding are tapered and the foils become shorter axially as their diameter increases. Thus the areas of the various foils and, therefore, their capacitances, remain substantially constant along the radius of the winding, and this insures uniform distribution of the applied potential. The core is bound with cotton tape which is coated with epoxy resin and cured by heating so as to form a strong bond. The core is completely saturated with an oil of high dielectric strength.

The customary method of oil impregnation consists of first drying the wound core under heat and vacuum, followed by saturation with hot oil which may or may not be pressurized. There is disclosed, hereinafter, an improved method for accomplishing this oil impregnation.

Among the advantages of the method of this invention are more thorough impregnation and shorter processing time than known methods, and the method affords a direct visual check to determine progress and completion of the impregnation as opposed to the conventional methods whereby electrical measurements are made to provide an indirect indication of the progress and completion of the impregnation.

When condenser bushings are impregnated in accordance with the teachings of this invention the resulting devices provide an impressive improvement over similar devices less thoroughly impregnated by prior methods, with respect to the ability to withstand high voltages during a long life.

Further features of the invention and its other aspects and advantages will become clear from the following detailed disclosure of an illustrative embodiment shown in the accompanying drawings. In those drawings Fig. 1 is a side elevational view showing in cross-section an impregnating device and a wound condenser bushing core mounted therein;

Fig. 2 is a side elevation cross-section of an enlarged fragmentary detail of Fig. 1 showing oil tight means for clamping the condenser bushing cores into the impregnating apparatus; and Fig. 3 is a graphical representation of internal pressures at various points along the length of a bushing core during the impregnation cycle.

In Figure 1 there is shown the bushing structure 2 positioned within impregnating means shown generally as 4. The impregnating means includes a lower chamber 6 containing de-gassed impregnating oil 8 and means 10 for heating the chamber and the impregnating oil for the purpose of decreasing the viscosity of the oil to expedite the impregnation process. A "steam jacket" 11 surrounds that part of the apparatus that contains the wound bushing. Inlet 12 permits the introduction of additional oil under pressure by means of conventional pumping means (not shown). The bushing core 2 is provided with an oil tight clamping ring mounted on the straight portion of the core 14 just below the cotton tape 16.

The oil tight clamping ring is shown in greater detail in Figure 2. A ring 18 is clamped between flange 20 of lower chamber 6 and flange 22 of upper chamber 24. A resilient ring 26 tightly grips bushing core 2. Locking ring 28 is bolted down to sealing ring 18 by a plurality of bolts 30 spaced about its circumference. This locking ring deforms ring 26 so that an oil tight seal is effected between it and the outer surface of bushing core 2. Neoprene or other oil resistant resilient material may be used for ring 26. Other means can be employed to accomplish the same function as this clamping ring. The method described is one which has been found practical in use.

The entire upper portion of the bushing core 2 is surrounded by a hermetically sealed tube 24 which has a "Pyrex" glass section 32 sealed to its upper end to make the upper end of the bushing 2 visible.

High vacuum is applied to this upper chamber 24 by a conventional pump (not shown) connected to outlet 34 while the lower chamber 6 is subjected to a high positive pressure, approximately 400 p.s.i. pressure for example, by a conventional pump (not shown). The oil 8 is thus driven longitudinally along the paper layers saturating the paper and sweeping out trapped gases. As the oil rises in the core, it begins to ooze out between the layers of the upper tapered section and profuse bubbling can be observed. Gradually, the oil rises in the evacuated upper chamber to cover the entire bushing 2. The bubbling action is at first vigorous and later diminishes to a slow rate and ceases. Because of the extreme tightness of the core winding, the process is very slow in spite of the high oil pressure, and upwards of eight hours is required for saturation of a condenser bushing having a condenser roll approximately 50 inches long and 5 inches in diameter.

By introducing a modification in the procedure a substantial improvement has been obtained. It has been discovered that by initially applying vacuum as above, and later applying a modest positive pressure at the "low pressure" end of the system, the time required for effective impregnation is greatly reduced. Even though the difference of pressure between the ends of the system is decreased, there is a reduction in the required impregnating time.

This unobvious and unexpected result may be explained in connection with Fig. 3. In this plot the ordinate represents the pressure within the core of bushing 2 through which oil has penetrated and the abscissa represents the corresponding distance from the high pressure end. The pressure $P_A$ at the lower (high pressure) end (A) of the bushing core 2 is known since it is the applied pressure. The pressure $P_{1B}$ at the upper end of the bushing core is also known, since it is the pressure at the outlet 34. The exact shape of the curve 36 between joints $P_A$ and $P_{1B}$ is not known but it may be assumed to take some shape similar to that shown for curve 36. Gas dissolves in oil as a function of pressure, and it may be presumed that at pressures above a pressure $P_D$ all the residual gas in the bushing core is in solution in the oil and that below pressure $P_D$ it comes out of solution. Thus as the oil flows from the lower end toward the upper end, all the gas not removed by vacuum goes into solution in the oil as the oil penetrates the roll. At a point along the bushing core, labeled "D" on the abscissa, the oil pressure equals pressure $P_D$. Beyond this point the gas comes out of solution and forms bubbles, which cling to the paper because of surface tension effects and are removed only with difficulty and at a slow rate. At portions of the roll below this point there are pressures greater than $P_D$ and no gas bubbles exist. Instead, the gas is carried along in solution.

In the improved system of impregnation now employed, oil 8 under high pressure at one end is permitted to penetrate into the wound paper core of bushing 2 while a vacuum is maintained at the opposite or upper end of the bushing core. This procedure is maintained until the upper end of the bushing 2 is covered with oil at which time bubbles can be observed coming from the end of the bushing core through glass window 32. At this stage the pressure is increased at the upper end to the pressure $P_{2B}$. At this time a pressure-distribution curve in the form of curve 38 may be postulated. All of the dissolved gasses are held in solution since pressure $P_{2B}$ is higher than pressure $P_D$. An effective value of pressure $P_{2B}$ is 5 p.s.i. above atmospheric pressure. The pressure may be raised by restricting the oil flow out of the low pressure chamber by means of a conventional valve until the visible flow of bubbles is eliminated or it can be raised by applying back pressure through suitable means such as a pump.

By maintaining the pressure in the entire length of the wound paper core of bushing 2 above $P_D$ the entrapped gas is carried in solution for the entire length of the paper winding and accordingly is much more efficiently removed.

At intervals, it may be desirable to check the progress of impregnation. This may be done by reducing the pressure at the upper end below the value of pressure $P_D$. Progress of impregnation is judged by the rate of bubble formation. This improvement has cut the impregnation time approximately in half as applied to the bushing core described.

The foregoing illustrative description of the invention as applied to the particular embodiment shown in the drawings is naturally susceptible of modification and varied application by those skilled in the art and, accordingly, the appended claims should be broadly construed in a manner consistent with the full spirit and scope of the invention.

What is claimed is:

1. The process of impregnating elongated articles with a liquid of a type in which gases may dissolve, comprising the steps of introducing said liquid in degassed condition at a high positive pressure $P_A$ at one end thereof, such high positive pressure being effective to force gases in the article to become dissolved in the liquid while maintaining the other end thereof at a pressure below that of the atmosphere until the liquid begins to emerge at the low pressure end and thereafter increasing the pressure at the said other end to a pressure $P_B$, where $P_B$ is less than $P_A$ but greater than the pressure required to maintain the gases dissolved in said liquid.

2. The process of impregnating an elongated article with a liquid of a type in which gases may dissolve comprising the steps of introducing said liquid in degassed condition under a high positive pressure $P_A$ at one end of said article while maintaining the other end of said article under a low pressure $P_B$ above atmospheric pressure, wherein $P_B$ is less than $P_A$ but greater than the pressure required to maintain the gases dissolved in said liquid.

3. The process of impregnating a core with a liquid of a type in which gases may dissolve, the core having tightly wound convolutions of sheet material whose edges are exposed at the ends thereof comprising the steps of introducing said liquid in degassed condition at a high positive pressure $P_A$ at one end of said core while maintaining the other end of said core at a pressure below that of the atmosphere, said high positive pressure being effective to force gases in the core to become dissolved in the liquid, and increasing the pressure at the said other end to a lower pressure $P_B$ after the liquid begins to flow through said other end, wherein $P_B$ is less than $P_A$ but greater than the pressure required to maintain the gases dissolved in said liquid.

4. The process of impregnating a tightly wound core of paper with oil, comprising the steps of introducing said oil in degassed condition at a high pressure $P_A$ at one end of said core while maintaining the other end of said core at a pressure below that of the atmosphere until oil emerges from the low pressure end of the coil, and increasing the pressure at the said other end to a pressure $P_B$, where $P_B$ is less than $P_A$ but greater than the pressure required to maintain gases dissolved in said oil.

5. The process of impregnating an elongated core of tightly wrapped paper with an oil, comprising the steps of introducing said oil in degassed condition under a high positive pressure $P_A$ at one end of said core while maintaining the other end of said core under a substantially lower pressure $P_B$ for a prolonged period of time, wherein $P_B$ is greater than the pressure required to prevent formation of bubbles in the oil that emerges at said other end of said core and thereby to cause gases present in the core to dissolve in the oil and to maintain gases dissolved in said oil.

6. The process of impregnating an elongated article with a liquid in which gases in the article are soluble comprising the steps of introducing said liquid in degassed condition at a high positive pressure at one end of said article while maintaining the other end of said article at a pressure below that of the atmosphere until the liquid emerges at the low-pressure end, in which bubbles inherently form, and increasing the pressure at the said other end to a value at which the bubbling substantially ceases, periodically thereafter dropping the pressure at the low-pressure end so as to apply vacuum thereto, and restoring the increased pressure until the periodic applications of vacuum at the low-pressure end no longer reveal bubbles.

7. The process of impregnating a tightly wound core of paper with oil, comprising the steps of introducing said oil in degassed condition at a pressure $P_A$ at one end of said core while maintaining the other end of said core at a pressure below that of the atmosphere until oil emerges at the low pressure end, in which bubbles inherently form, and increasing the pressure at the said other end to a value at which the bubbling substantially ceases, periodically reducing the pressure at said other end so as to apply vacuum thereto, and restoring the increased pressure until applications of vacuum at the low-pressure end no longer reveal bubbles.

8. The process of impregnating a tightly wound core of fibrous material such as paper with an insulating impregnating liquid such as oil comprising the steps of introducing said impregnating liquid in degassed condition at a pressure $P_A$ at one end of said core while maintaining the other end of said core at a pressure below that of the atmosphere until the impregnating liquid emerges at the low pressure end, in which bubbles inherently form, and thereafter increasing the pressure at said other end to a value at which the bubbling substantially ceases.

9. The process of impregnating a core with a liquid of a type in which gases may dissolve, the core having tightly wound convolutions of sheet material whose edges are exposed at the ends of the core, comprising the steps of introducing the liquid in degassed condition under a pressure $P_A$ at one end of the core, where the pressure $P_A$ is more than adequate to force gases that may be present in the core into solution in the liquid, while maintaining the other end of the core under a pressure $P_B$, where $P_B$ is substantially less than $P_A$ but greater than the pressure required to prevent formation of bubbles in the liquid emerging from said other end of the core and thereby to maintain the gases dissolved in said liquid.

References Cited in the file of this patent

UNITED STATES PATENTS

| | | |
|---|---|---|
| 116,969 | Lear | July 11, 1871 |
| 231,784 | Flad | Aug. 31, 1880 |
| 716,401 | Ferrell | Dec. 23, 1902 |
| 735,019 | Pfister | July 28, 1903 |
| 797,275 | Gilmore | Aug. 15, 1905 |
| 1,374,362 | Davis et al. | Apr. 12, 1921 |
| 2,692,210 | Burnham | Oct. 19, 1954 |

FOREIGN PATENTS

| | | |
|---|---|---|
| 17,317 | Australia | Aug. 6, 1929 |
| 375,890 | Great Britain | July 7, 1932 |
| 145,266 | Australia | Feb. 19, 1952 |